United States Patent
Lalleman

(10) Patent No.: US 12,533,311 B2
(45) Date of Patent: Jan. 27, 2026

(54) METHOD FOR DYEING KERATIN FIBRES STARTING FROM ISATIN AND FROM POWDER AND/OR DYE EXTRACT OF INDIGO-PRODUCING PLANTS

(71) Applicant: L'Oreal, Paris (FR)

(72) Inventor: Boris Lalleman, Saint-Ouen (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 18/699,550

(22) PCT Filed: Oct. 7, 2022

(86) PCT No.: PCT/EP2022/077965
§ 371 (c)(1),
(2) Date: Apr. 8, 2024

(87) PCT Pub. No.: WO2023/061880
PCT Pub. Date: Apr. 20, 2023

(65) Prior Publication Data
US 2024/0415762 A1    Dec. 19, 2024

(30) Foreign Application Priority Data

Oct. 11, 2021  (FR) ...................................... 2110734

(51) Int. Cl.
| | | |
|---|---|---|
| *A61G 5/00* | (2006.01) | |
| *A61K 8/365* | (2006.01) | |
| *A61K 8/49* | (2006.01) | |
| *A61K 8/9789* | (2017.01) | |
| *A61Q 5/06* | (2006.01) | |

(52) U.S. Cl.
CPC ............ *A61K 8/9789* (2017.08); *A61K 8/365* (2013.01); *A61K 8/492* (2013.01); *A61Q 5/065* (2013.01)

(58) Field of Classification Search
CPC ...... A61K 8/9789; A61K 8/365; A61K 8/492; A61Q 5/065
USPC ........................................................ 8/405, 407
See application file for complete search history.

(56) References Cited

U.S. PATENT DOCUMENTS

| | | | |
|---|---|---|---|
| 4,750,908 A | 6/1988 | Rosenbaum et al. | |
| 5,865,853 A | 2/1999 | Schmitt et al. | |
| 6,656,229 B1 * | 12/2003 | Taguchi | A61K 8/9789 8/405 |
| 2012/0204357 A1 * | 8/2012 | Lalleman | A61K 8/492 8/405 |
| 2012/0210523 A1 * | 8/2012 | Lalleman | A61Q 5/065 8/408 |

FOREIGN PATENT DOCUMENTS

| | | | | |
|---|---|---|---|---|
| FR | 3075637 A1 | 6/2019 | | |
| FR | 3075637 B1 * | 11/2019 | | A61Q 5/065 |
| WO | WO 2019122331 A1 * | 6/2019 | | A61Q 5/065 |
| WO | WO 2019122436 A1 * | 6/2019 | | A61Q 5/065 |
| WO | 2023061880 A1 | 4/2023 | | |

OTHER PUBLICATIONS

International Preliminary Report on Patentability, mailed Apr. 25, 2024, 7 pages.
International Search Report and Written Opinion in PCT/EP2022/077965, mailed Jan. 27, 2023, 9 pages.
Kirk-Othmer Encyclopedia of Chemical Technology. Updated Apr. 17, 2009.
Morel OJ, Christie RM. Current trends in the chemistry of permanent hair dyeing. Chemical reviews. Apr. 13, 2011;111 (4):2537-61.

* cited by examiner

*Primary Examiner* — Eisa B Elhilo
(74) *Attorney, Agent, or Firm* — The Marbury Law Group, PLLC

(57) ABSTRACT

Method for dyeing keratin fibres starting from isatin and from powder and/or dye extract of indigo-producing plants A subject-matter of the present invention is a method for dyeing keratin fibres, comprising the application, to the hair, of isatin and of at least one powder and/or one extract of indigo-producing plant(s).

20 Claims, No Drawings

METHOD FOR DYEING KERATIN FIBRES STARTING FROM ISATIN AND FROM POWDER AND/OR DYE EXTRACT OF INDIGO-PRODUCING PLANTS

CROSS REFERENCE TO RELATED APPLICATIONS

This is a National Stage Application of PCT/EP2022/077965, filed internationally on Oct. 7, 2022, which claims priority to French Application No. 2110734, filed on Oct. 11, 2021, the content of both of which are incorporated by reference herein in their entireties.

A subject-matter of the invention is a method for dyeing keratin fibres comprising the application, to the keratin fibres, in particular human keratin fibres, such as the hair, of isatin and of at least one powder and/or at least one dye extract of indigo-producing plants.

Another subject-matter of the present invention is the use of isatin for stabilizing over time the colour of keratin fibres coloured starting from a composition comprising powder of indigo-producing plants and/or a dye extract of indigo-producing plants.

Two major methods exist for dyeing human keratin fibres, in particular the hair.

One of these two methods is oxidation dyeing or permanent dyeing. This dyeing method uses one or more oxidation dye precursors, usually one or more oxidation bases optionally combined with one or more couplers. In general, oxidation bases are chosen from ortho- or para-phenylenediamines, ortho- or para-aminophenols and also heterocyclic compounds. These oxidation bases are colourless or weakly coloured compounds which, combined with oxidizing products, make it possible to access coloured entities. The shades obtained with these oxidation bases are quite often varied by combining them with one or more couplers, the latter being chosen in particular from aromatic meta-diamines, meta-aminophenols, meta-diphenols and certain heterocyclic compounds, such as indole compounds. The variety of the molecules involved as oxidation bases and couplers makes it possible to obtain a rich palette of colours. This type of dyeing also makes it possible to obtain permanent colourings but the use of oxidizing agents can cause degradation of the keratin fibres.

The second dyeing method, known as direct or semi-permanent dyeing, comprises the application of direct dyes which are molecules having an affinity for the fibres and which are colouring, even in the absence of an oxidizing agent in the compositions containing them. Given the nature of the molecules employed, the latter tend to remain at the surface of the fibre and penetrate relatively little into the fibre, in comparison with the small molecules of oxidation dye precursors. The advantage of this latter type of dyeing is that it does not require an oxidizing agent, which limits the degradation of the fibres. The resulting colourations are generally chromatic but are, however, less persistent than the colourings obtained in oxidation dyeing. The nature of the interactions which bind the direct dyes to the keratin fibres and also their desorption from the surface and/or from the core of the fibre are responsible for their lower persistence.

The first hair dyes were semi-permanent. One of the most widely-known natural dyes is indigo (see Ullmann's Encyclopedia of Industrial Chemistry, "Hair Preparation", point 5.2.3, 2006, Wiley-VCH Verlag Gmbh & Co. KGaA, Weinheim; 10.1002/14356007.a12 571.pub2). Indigo continues to be used in female beauty enhancement by dyeing the hair or the nails, or for dyeing fabrics (jeans), leather, silk, wool, and the like. Indigo [482-89-3] is a natural blue dye and its isomer indirubin is red.

Their empirical formula is: $C_{16}H_{10}N_2O_2$; and their chemical structures are as follows:

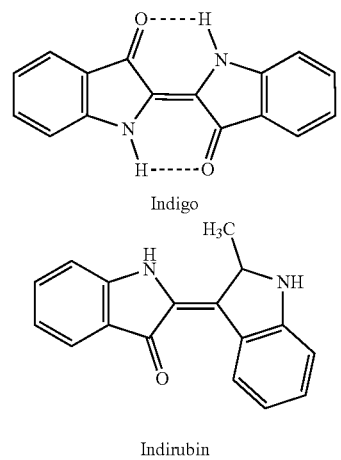

Indigo

Indirubin

The presence of these two isomers explains the presence of a purplish colour of indigo which is more or less pronounced as a function of the respective proportions in the individual hair of the two isomers formed in the individual hair (in particular from purple to crimson if the amount of indirubin increases).

Indigo, which results from indican, can be prepared from various "indigo-producing" plants, such as Indigofera tinctoria, Indigo suffruticosa, *Polygonum tinctorium*, and the like (see Kirk-Othmer Encyclopedia of Chemical Technology, updated on 17 Apr. 2009, DOI: 10.1002/0471238961.0425051903150618.a01.pub2). The indigo-producing plants are generally chopped up and soaked in hot water, heated, fermented and oxidized in the open air to release the indigo of mauve-blue colour (see Chem. Rev., 2011, 111, 2537-2561, pp. 2537-2561). Indigo is the result of the hydrolysis and then of the oxidation of indican (glycosyl precursor).

However, hair dyeing starting from indigo leaves is difficult because the dyeing kinetics in the keratin fibres are variable. The dyeing process starting from indigo leaf powder is difficult to control because of the competing reaction of formation of indirubin (which also involves an intermediate stage of oxidation with formation of yellow-coloured isatin) giving yellow to dark purple tints to the hair over time.

The colourings resulting from indigo are thus generally evolutive over time in terms of colour; they exhibit a characteristic yellow/green colouring on the day of the dyeing (relatively unattractive "raw" colour, not much appreciated by dye users) which changes towards the desired colourings after a few hours (48 hours), indeed even a few days (a week). This colour can additionally change over time, with the appearance of purplish-red tints, after generally two to three weeks.

In order to overcome this problem of relatively unattractive colouring on the day of the dyeing and which changes over time, it is known to add direct dyes in order to conceal the undesirable tints. These direct dyes are generally those employed in direct dyeing, such as nitrobenzene, anthraquinone, nitropyridine, azo, methine, azomethine, xanthene, acridine, azine or triarylmethane direct dyes (see, for example, EP 0 806 199). However, although being concealed, the tint introduced on the day of the application does not prevent the change in colour over time.

There thus exists a real need to develop dyeing methods based on natural dyes, in particular based on powders or extracts of indigo-producing plants, which make it possible to obtain powerful colourings exhibiting a good colour build-up, and varied shades (natural, chromatic and intermediate), which are relatively non-selective (homogeneous from the root to the ends) and attractive from the end of the dyeing, which do not exhibit unattractive yellow/green tints and do not turn red over time.

These colourings should also exhibit good resistance to external agents (light, bad weather, shampoos), while remaining persistent and/or homogeneous.

This aim is achieved by the present invention, a subject-matter of which is a method for dyeing keratin fibres, in particular human keratin fibres, comprising the application, to the keratin fibres, of isatin and of at least one natural dye chosen from a powder and/or a dye extract of indigo-producing plants, applied together or separately.

According to one embodiment, the method for dyeing keratin fibres according to the invention comprises the following stages:
a stage a) of application of a composition comprising at least one natural dye chosen from a powder and/or a dye extract of indigo-producing plant(s); and
a stage b) of application of a composition comprising isatin.

The method according to the invention makes it possible in particular to minimize the yellow/green tints introduced by the indigo on the day of the dyeing and to stabilize the colouring over time.

The colouring is powerful and attractive from the day of the application, while remaining natural and while preserving the integrity of the keratin fibres. Furthermore, the colour exhibits good resistance to external agents. In addition, it is homogeneous.

Other subject-matters, characteristics, aspects and advantages of the present invention will become even more clearly apparent on reading the description and the examples which follow.

In the description, the term "at least one" is equivalent to one or more.

Within the meaning of the present invention, "build-up" of the colour of the keratin fibres is understood to mean the variation in colouring between locks of undyed hair and locks of dyed hair.

The term "natural dye" is understood to mean any dye or dye precursor originating from a natural source, in particular of plant origin. Natural dyes can in particular be obtained by extraction (and optionally purification) from a plant matrix, by grinding plants or plant parts, roots, wood, bark, berries, lichens, leaves, flowers, nuts or seeds. Natural dyes can also be obtained by fermentation.

Thereafter, when a substance is said to be "synthetic", it is understood that it has no natural occurrence and that it is obtained solely by chemical synthesis or hemisynthesis. In particular, it is a substance which is not obtained from a plant matrix.

In the present patent application, "alkyl" or "alk" radical or group is understood to mean a hydrocarbon chain. This chain can be linear or branched, interrupted by atoms or groups of atoms. It can also comprise substituents, such as atoms or groups of atoms. It comprises a number of atoms which is indicated by the formula $C_x$-$C_y$, with x and y respectively the minimum number and the maximum number which the longest linear chain comprises.

In that which follows and unless otherwise indicated, the limits of a range of values are included within this range, in particular in the expressions "of between" and "ranging from . . . to . . . ".

In the present patent application, when compounds are mentioned, this is also understood to mean their optical isomers, their geometrical isomers, their tautomers, their salts and/or their solvates, alone or as a mixture.

Powder of Indigo-Producing Plants and/or Dye Extract of Indigo-Producing Plant(s)

The method according to the invention employs at least one powder of indigo-producing plants and/or at least one dye extract of indigo-producing plant(s).

"Powder of indigo-producing plant" and "dye extract of indigo-producing plant" differ in that the powder is a product originating from the indigo-producing plants, said plants or plant parts being reduced by grinding or other mechanical means to give fine particles, and the extract is a product obtained after maceration of the indigo-producing plants or indigo-producing plant parts in water, organic solvents or their mixtures.

Preferably, mention may be made, as indigo-producing plants useful according to the invention, of numerous species resulting from the genera:
*Indigofera*, such as *Indigofera tinctoria*, *Indigo suffruticosa*, *Indigofera articulata*, *Indigofera arrecta*, *Indigofera gerardiana*, *Indigofera argentea*, *Indigofera indica*, *Indigofera longiracemosa*;
*Isatis*, such as *Isatis tinctoria*;
*Polygonum* or *Persicaria*, such as *Polygonum tinctorium* (*Persicaria tinctoria*);
*Wrightia*, such as *Wrightia tinctoria*;
*Calanthe*, such as *Calanthe veratrifolia*; and
*Baphicacanthus*, such as *Baphicacanthus cusia*.

In the context of the present invention, each indigo-producing plant can be used alone or as a mixture with other indigo-producing plants. Preferably, a single indigo-producing plant is used.

Preferably, the indigo-producing plant is of the genus *Indigofera* and more particularly is chosen from *Indigofera tinctoria*, *suffruticosa*, *argentea* or their mixture, preferably *Indigofera tinctoria*.

All or part of the indigo-producing plants can be used. Use is made in particular of the leaves for *Indigofera tinctoria*.

The powder of indigo-producing plant(s) can be sieved.

According to a specific mode of the invention, the powder of indigo-producing plant(s) is constituted of fine particles with particle sizes of less than or equal to 500 µm, preferably inclusively of between 50 and 300 µm and more preferentially between 10 and 200 µm.

The particles of indigo-producing plant(s) preferentially have a water content of between 0% and 10% by weight, with respect to the total weight of the powders of plant(s).

Mention be made, among the dye extracts of indigo-producing plants useful according to the method of the invention, of indican and the natural extracts containing it.

The powders of indigo-producing plants and/or dye extracts of indigo-producing plant(s) as defined above are applied from a composition containing them, preferably in a total content ranging from 0.01% to 50% by weight, with respect to the total weight of the composition in which they are found, preferably from 1% to 40% by weight, more preferentially from 10% to 35% by weight, more preferentially still from 15% to 30% by weight and better still between 17% and 25% by weight, with respect to the total weight of the composition containing them.

According to another embodiment, the powder(s) of indigo-producing plant(s) as defined above are employed in the method according to the invention in a total content of at least 40% by weight, preferably from 50% to 100% by weight, better still from 60% to 98% by weight, even better still from 70% to 95% by weight, with respect to the total weight of the composition containing them.

Isatin

Isatin

The method according to the invention employs isatin.

Isatin and the natural dye(s) chosen from a powder of indigo-producing plants and/or a dye extract of indigo-producing plant(s) can be applied together or separately.

The term "applied together" is understood to mean that isatin and the natural dye(s) chosen from a powder of indigo-producing plants and/or a dye extract of indigo-producing plant(s) are applied from one and the same composition.

The term "applied separately" is understood to mean that isatin and the natural dye(s) chosen from a powder of indigo-producing plants and/or a dye extract of indigo-producing plant(s) are applied from separate compositions.

According to one embodiment, isatin and the natural dye(s) chosen from a powder of indigo-producing plants and/or a dye extract of indigo-producing plant(s) are applied together.

Preferably, when they are applied together, isatin is applied from a composition containing it in a total content ranging from 0.01% to 5% by weight, with respect to the total weight of the composition in which it is found, more preferentially from 0.02% to 2% by weight, more preferentially still from 0.04% to 1% by weight.

According to one embodiment, isatin and the natural dye(s) chosen from a powder of indigo-producing plants and/or a dye extract of indigo-producing plant(s) are applied separately.

Preferably, when they are applied separately, isatin is applied from a composition containing it in a total content ranging from 0.01% to 5% by weight, preferably from 0.05% to 2% by weight, more preferentially from 0.1% to 1% by weight, more preferentially still from 0.2% to 0.5% by weight.

According to a preferred embodiment of the invention, the composition(s) employed in the method according to the invention is or are aqueous. According to this embodiment, the pH of this (these) composition(s) is acidic, preferably is of between 2 and 6.9.

According to a first alternative form of this embodiment, the pH of this (these) composition(s) preferably varies from 5.0 to 6.9, more preferentially still between 5.0 and 6.2.

According to a second alternative form of this embodiment, the pH of this (these) composition(s) preferably varies from 2.0 to 5.0, better still from 2.0 to 4.0, more preferentially still from 2.0 to 3.0.

The pH of these compositions can be adjusted to the desired value by means of acidic or alkaline agent(s) commonly used in the dyeing of keratin fibres or alternatively using buffer systems known to a person skilled in the art. The acidifying agents are conventionally, by way of example, mineral or organic acids, such as hydrochloric acid, orthophosphoric acid or sulfonic acids. The basifying agents are conventionally, by way of example, salts of sodium hydroxide, of ammonia or of potassium hydroxide or salts of organic amines, such as alkanolamines.

The term "buffer system" is understood to mean a mixture of an acid and of at least one of its conjugate bases, more specifically of at least one of its conjugate salts.

The formulation of buffer systems is well known to a person skilled in the art.

Preferably, the composition employed in stage b) of the method according to the invention comprises a buffer system comprising at least one mineral (inorganic) acid and at least one of its conjugate bases, namely the inorganic salt of said inorganic acid.

Preferably, the inorganic acid is chosen from acids exhibiting a pKa (pKa1) of less than 4.5, preferably ranging from 1 to 4, better still from 2 to 4.

The inorganic acid is chosen, for example, from phosphorus-based acids, such as phosphoric acid, halogen-based acids, such as hydrochloric acid, and sulfur-based acids, such as sulfuric acid, and their mixtures.

According to a specific embodiment, the inorganic acid is phosphoric acid.

The buffer capacity of the buffer system according to the invention is advantageously optimized when the acid, preferably the inorganic acid, and its conjugate salt(s) are used in the composition according to the invention in an acid/conjugate salt(s) molar ratio ranging from 1:10 to 10:1, better still from 1:5 to 5:1, even better still from 1:3 to 3:1, more preferably from 1:2 to 2:1.

The acid, preferably the inorganic acid, can represent from 0.05% to 10% by weight, preferably from 0.1% to 3% by weight, better still from 0.15% to 2% by weight, with respect to the total weight of the composition.

The conjugate acid salt(s), preferably the inorganic acid salt(s), can be present in a content ranging from 0.05% to 10% by weight, preferably from 0.1% to 3% by weight, better still from 0.15% to 2% by weight, with respect to the total weight of the composition.

Preferably, the composition employed in stage b) according to the invention comprises a buffer system. Preferentially, the buffer system comprises at least phosphoric acid ($H_3PO_4$) and at least one inorganic phosphate salt, chosen in particular from potassium dihydrogen phosphate $KH_2PO_4$, sodium dihydrogen phosphate $NaH_2PO_4$, dipotassium hydrogen phosphate $K_2HPO_4$, disodium hydrogen phosphate $Na_2HPO_4$, potassium phosphate $K_3PO_4$, sodium phosphate $Na_3PO_4$ and their mixtures, preferably from potassium dihydrogen phosphate $KH_2PO_4$ or sodium dihydrogen phosphate $NaH_2PO_4$.

The conjugate acid salt, in particular the conjugate inorganic acid salt, can be provided in the solvate form, in particular in the hydrate form.

Preferably, phosphoric acid represents from 0.05% to 10% by weight, preferably from 0.1% to 5% by weight, better still from 0.15% to 2% by weight, with respect to the total weight of the composition employed in stage b).

Preferably, the inorganic phosphate salt, chosen in particular from potassium dihydrogen phosphate $KH_2PO_4$, sodium dihydrogen phosphate $NaH_2PO_4$, dipotassium hydrogen phosphate $K_2HPO_4$, disodium hydrogen phosphate Na$_2$HPO$_4$, potassium phosphate K$_3$PO$_4$, sodium phosphate Na$_3$PO$_4$ and their mixtures, is present in a content ranging from 0.05% to 10% by weight, preferably from 0.1% to 5% by weight, better still from 0.15% to 2% by weight, with respect to the total weight of the composition.

According to an advantageous embodiment, phosphoric acid and its conjugate salt (inorganic phosphate salt), in particular chosen from potassium dihydrogen phosphate KH$_2$PO$_4$, sodium dihydrogen phosphate NaH$_2$PO$_4$, dipotassium hydrogen phosphate K$_2$HPO$_4$, disodium hydrogen phosphate Na$_2$HPO$_4$, potassium phosphate K$_3$PO$_4$, sodium phosphate Na$_3$PO$_4$ and their mixtures, are used in the composition according to the invention in an acid/conjugate salt(s) molar ratio ranging from 1:10 to 10:1, better still from 1:5 to 5:1, even better still from 1:3 to 3:1, more preferably from 1:2 to 2:1.

In a particularly preferred alternative form of the invention, the composition employed in stage b) comprises phosphoric acid and an inorganic phosphate salt chosen from potassium phosphate K$_3$PO$_4$ and sodium phosphate Na$_3$PO$_4$, more preferentially sodium phosphate Na$_3$PO$_4$.

Additional Direct Dyes

The method according to the invention can also employ one or more additional direct dye(s) other than the powder(s) and/or dye extract(s) of indigo-producing plant(s) and other than isatin.

Preferably, the method according to the invention also employs one or more additional direct dye(s) other than the powder(s) and/or dye extract(s) of indigo-producing plant(s) and other than isatin.

Preferably, stage a) of the method according to the invention employs the application of one or more additional direct dye(s) other than the powder(s) and/or dye extract(s) of indigo-producing plant(s) and other than isatin.

When they are present, the additional direct dye(s) are preferably applied to the keratin fibres from a composition which also comprises at least one powder of indigo-producing plants and/or at least one dye extract of indigo-producing plant(s).

These additional direct dyes can be synthetic or natural.

The term "direct dye" is understood to mean coloured entities. These are dyes which will spread superficially over the fibre.

The synthetic additional direct dyes are, for example, chosen from those conventionally used in direct dyeing, and among which may be mentioned all the aromatic and/or non-aromatic dyes which are commonly used, such as nitrobenzene, azo, hydrazono, nitro (hetero) aryl, tri (hetero) arylmethane, (poly) methine, carbonyl, azine, porphyrin, metalloporphyrin, quinone and in particular anthraquinone, indoamine and phthalocyanine direct dyes, and their mixtures. Mention may be made, among the nitrobenzene additional direct dyes, of: 1,4-diamino-2-nitrobenzene, 1-amino-2-nitro-4-β-hydroxyethylaminobenzene; 1-amino-2-nitro-4-bis(β-hydroxyethyl)aminobenzene; 1,4-bis(β-hydroxyethylamino)-2-nitrobenzene; 1-β-hydroxyethylamino-2-nitro-4-bis(β-hydroxyethylamino) benzene; 1-β-hydroxyethylamino-2-nitro-4-aminobenzene; 1-β-hydroxyethylamino-2-nitro-4-(ethyl) (β-hydroxyethyl) aminobenzene; 1-amino-3-methyl-4-β-hydroxyethylamino-6-nitrobenzene; 1-amino-2-nitro-4-β-hydroxyethylamino-5-chlorobenzene; 1,2-diamino-4-nitrobenzene; 1-amino-2-β-hydroxyethylamino-5-nitrobenzene; 1,2-bis(β-hydroxyethylamino)-4-nitrobenzene; 1-amino-2-tris(hydroxymethyl) methylamino-5-nitrobenzene; 1-hydroxy-2-amino-5-nitrobenzene; 1-hydroxy-2-amino-4-nitrobenzene; 1-hydroxy-3-nitro-4-aminobenzene; 1-hydroxy-2-amino-4,6-dinitrobenzene; 1-β-hydroxyethyloxy-2-β-hydroxyethylamino-5-nitrobenzene; 1-methoxy-2-β-hydroxyethylamino-5-nitrobenzene; 1-β-hydroxyethyloxy-3-methylamino-4-nitrobenzene; 1-β,γ-dihydroxypropyloxy-3-methylamino-4-nitrobenzene; 1-β-hydroxyethylamino-4-β,γ-dihydroxypropyloxy-2-nitrobenzene; 1-β,γ-dihydroxypropylamino-4-trifluoromethyl-2-nitrobenzene; 1-β-hydroxyethylamino-4-trifluoromethyl-2-nitrobenzene; 1-β-hydroxyethylamino-3-methyl-2-nitrobenzene; 1-β-aminoethylamino-5-methoxy-2-nitrobenzene; 1-hydroxy-2-chloro-6-ethylamino-4-nitrobenzene; 1-hydroxy-2-chloro-6-amino-4-nitrobenzene; 1-hydroxy-6-bis(β-hydroxyethyl)amino-3-nitrobenzene; 1-β-hydroxyethylamino-2-nitrobenzene; 1-hydroxy-4-β-hydroxyethylamino-3-nitrobenzene.

Mention may be made, among the azo additional direct dyes, of: Basic Red 51, Basic Orange 31, Disperse Red 17, Acid Yellow 9, Acid Black 1, Basic Red 22, Basic Red 76, Basic Yellow 57, Acid Yellow 36, Acid Orange 7, Acid Red 33, Acid Red 35, Acid Yellow 23, Acid Orange 24, Disperse Black 9, Basic Brown 16, Basic Brown 17.

Mention may be made, among the hydrazono additional direct dyes, of: Basic Yellow 87.

Mention may be made, among the nitroaryl additional direct dyes, of: HC Blue 2, HC Yellow 2, HC Red 3, 4-hydroxypropylamino-3-nitrophenol, N,N'-bis(2-hydroxyethyl)-2-nitrophenylenediamine.

Mention may be made, among the triarylmethane additional direct dyes, of: Basic Violet 1, Basic Violet 2, Basic Violet 3, Basic Violet 4, Basic Violet 14, Basic Blue 1, Basic Blue 7, Basic Blue 26, Basic Green 1, Basic Blue 77 (also known as HC Blue 15), Acid Blue 1; Acid Blue 3; Acid Blue 7, Acid Blue 9; Acid Violet 49; Acid Green 3; Acid Green 5; Acid Green 50.

Mention may be made, among the quinone additional direct dyes, of: Disperse Red 15, Solvent Violet 13, Acid Violet 43, Disperse Violet 1, Disperse Violet 4, Disperse Blue 1, Disperse Violet 8, Disperse Blue 3, Disperse Red 11, Acid Blue 62, Disperse Blue 7, Basic Blue 22, Disperse Violet 15, Basic Blue 99, and also the following compounds: 1-N-methylmorpholiniumpropylamino-4-hydroxyanthraquinone, 1-aminopropylamino-4-methylaminoanthraquinone, 1-aminopropylaminoanthraquinone, 5-β-hydroxyethyl-1,4-diaminoanthraquinone, 2-aminoethylaminoanthraquinone, 1,4-bis(β,γ-dihydroxypropylamino) anthraquinone, Acid Blue 25, Acid Blue 43, Acid Blue 78, Acid Blue 129, Acid Blue 138, Acid Blue 140, Acid Blue 251, Acid Green 25, Acid Green 41, Acid Violet 42, Mordant Red 3, Acid Black 48, HC Blue 16.

Mention may be made, among the azine additional direct dyes, of: Basic Blue 17, Basic Red 2.

Mention may be made, among the indoamine additional direct dyes, of: 2-β-hydroxyethylamino-5-[bis(β-4'-hydroxyethyl)amino]anilino-1,4-benzoquinone, 2-β-hydroxyethylamino-5-(2'-methoxy-4'-amino) anilino-1,4-benzoquinone, 3-N-(2'-chloro-4'-hydroxy)phenylacetylamino-6-methoxy-1,4-benzoquinone imine, 3-N-(3'-chloro-4'-methylamino)phenylureido-6-methyl-1,4-benzoquinone imine, 3-[4'-N-(ethyl, carbamylmethyl)amino]phenylureido-6-methyl-1,4-benzoquinone imine.

The natural direct dyes other than the powder(s) and the dye extract(s) of indigo-producing plant(s) and other than isatin are chosen, for example, from lawsone, juglone, hennotannic acid, alizarin, carthamin, morin, purpurin, carminic acid, kermesic acid, laccaic acid, purpurogallin, protocatechualdehyde, curcumin, spinulosin, apigenidin, orceins, carotenoids, betanin, chlorophylls, chlorophyllins, monascus, polyphenols or ortho-diphenols.

Mention may be made, among the ortho-diphenols which are of use according to the invention, of: catechin, quercetin, brazilin, haematein, haematoxylin, chlorogenic acid, caffeic acid, gallic acid, L-DOPA, cyanidin, (−)-epicatechin, (−)-epigallocatechin, (−)-epigallocatechin 3-gallate (EGCG), isoquercetin, pomiferin, esculetin, 6,7-dihydroxy-3-(3-hydroxy-2,4-dimethoxyphenyl) coumarin, santalin A and B, mangiferin, butein, maritimetin, sulfuretin, robtein, betanidin, pericampylinone A, theaflavin, proanthocyanidin A2, proanthocyanidin B2, proanthocyanidin C1, procyanidins DP 4-8, tannic acid, purpurogallin, 5,6-dihydroxy-2-methyl-1,4-naphthoquinone, alizarin, wedelolactone and the natural extracts containing them.

These additional direct dyes are preferably chosen from natural direct dyes other than the powder(s) and the dye extract(s) of indigo-producing plant(s) and other than isatin, preferentially chosen from natural direct dyes other than the powder(s) and the dye extract(s) of indigo-producing plant (s), more preferentially chosen from lawsone and henna extracts and/or powders, more preferentially still lawsone.

These natural direct dyes other than the powder(s) and the dye extract(s) of indigo-producing plant(s) and other than isatin can be added in the form of defined compounds, of extracts or of parts of plants. The defined compounds, extracts or parts of plants are preferably in the form of powders, in particular fine powders, the particles of which have sizes identical to that of the powder of indigo-producing plant(s) as defined above.

The term "henna" is understood to mean a henna plant powder and/or a henna plant dye extract, preferably from a henna plant, such as *Lawsonia alba* or *Lawsonia inermis*. The henna plant powder and/or dye extract comprises in particular lawsone and/or one of its glucosyl precursors and other derivatives, such as THAP or 2,3,4,6-tetrahydroxyacetophenone and its glycosyl versions. Preferably, the henna used according to the present invention is in the powder form. The henna used in the invention is preferably red henna (*Lawsonia inermis*, alba). Lawsone [83-72-7](CI Natural Orange 6; CI 75420), also known under the name of isojuglone, can be found in henna (*Lawsonia alba, Lawsonia inermis*) bushes. Preferably, the henna is in the form of leaf powder.

The additional direct dyes other than the powder(s) and the dye extract(s) of indigo-producing plant(s) and other than isatin as are defined above, when they are present, are preferably applied from a composition containing them in a total content ranging from 0.01% to 50% by weight, with respect to the total weight of the composition in which they are found, preferably from 0.1% to 50% by weight, better still from 0.3% to 40% by weight, with respect to the total weight of the composition containing them.

Solvents

The method according to the invention can be carried out starting from one or more composition(s) which comprise the ingredients as described above and which can additionally contain one or more solvent(s) chosen from water and organic solvents.

Preferably, the compositions employed in the method according to the invention comprise at least one solvent chosen from water or organic solvents.

The compositions employed in the method according to the invention can contain a mixture of organic solvents or a mixture of water and of one or more organic solvents.

The term "organic solvent" is understood to mean an organic substance which is capable of dissolving or dispersing another substance without chemically modifying it.

The organic solvent(s) of use in the compositions of the invention is or are chosen from lower $C_1$-$C_4$ alkanols, such as ethanol and isopropanol; polyols and polyol ethers, such as 2-butoxyethanol, propylene glycol (1,2-propanediol), propylene glycol monomethyl ether, diethylene glycol monoethyl ether and monomethyl ether, hexylene glycol, and also aromatic alcohols, such as benzyl alcohol or phenoxyethanol. Preferably, the organic solvents of use in the compositions of the invention are chosen from lower $C_1$-$C_4$ alkanols; polyols and polyol ethers, aromatic alcohols and their mixtures, preferably chosen from: diols, such as: butane-1,4-diol, butane-1,2-diol, butane-1,3-diol, butane-2,3-diol, propane-1,2-diol (propylene glycol), pentane-1,2-diol, pentane-1,5-diol, pentane-2,4-diol, pentane-1,3-diol, hexane-1,6-diol, hexane-1,2-diol, hexane-2,5-diol, 2-methyl-2,4-pentanediol (hexylene glycol), diethylene glycol, dipropylene glycol, triethylene glycol; triols, such as: hexane-1,2,6-triol, glycerol; tetraols, such as erythritol; benzyl alcohol; phenoxyethanol; ethanol and their mixtures.

More preferentially, the organic solvent(s) of use in the compositions of the invention is or are chosen from ethanol, benzyl alcohol, 1,2-pentanediol, propylene glycol (1,2-propanediol) and their mixtures, more preferentially still benzyl alcohol.

Preferably, the composition(s) comprising isatin and/or at least one natural dye chosen from the powder and/or a dye extract of indigo-producing plant(s) is (are) aqueous.

Preferably, when the isatin is applied separately from the natural dye(s), it is employed starting from a composition comprising at least one organic solvent.

When it is present, the water represents a content ranging from 10% to 99.9% by weight, preferably from 20% to 99% by weight, better still from 30% to 95% by weight, indeed even from 70% to 90% by weight, with respect to the total weight of the composition.

Carboxylic Acid(s)

The method according to the invention can employ at least one carboxylic acid of following formula (I) or one of its salts:

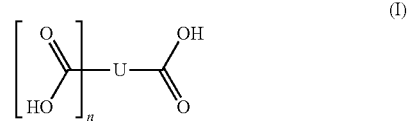

in which:
U represents a monovalent group, when n has the value 0, or a polyvalent group, when n is greater than or equal to 1, saturated or unsaturated, cyclic or non-cyclic, aromatic or non-aromatic, hydrocarbon-based group comprising from 1 to 8 carbon atoms which is optionally interrupted by one or more heteroatoms and/or optionally substituted, in particular by one or more hydroxyl groups; preferably, U represents a monovalent ($C_1$-$C_6$)alkyl group or a polyvalent ($C_1$-$C_6$)alkylene group optionally substituted by one or more hydroxyl and/or amino groups;

n represents an integer of between 0 and 10 inclusive; preferably, n is of between 0 and 5, such as between 0 and 2.

Preferably, the method according to the invention employs at least one carboxylic acid of formula (I) or one of its salts.

The carboxylic acids of formula (I) of use according to the invention are preferably chosen from α-hydroxy acids.

Mention may be made, as preferred examples of carboxylic acids of formula (I), of glycolic acid, citric acid, lactic acid, tartaric acid or one of their salts, preferably glycolic acid or lactic acid or one of their salts, better still lactic acid or one of its salts.

The salts of the acids of formula (I) can be salts of organic or inorganic bases or of basifying agents as defined above.

Preferably, the composition employed in stage b) of the method according to the invention comprises at least one carboxylic acid of formula (I).

According to one embodiment, the carboxylic acid(s) of formula (I) are applied from a composition comprising them in a total content ranging from 0.01% to 30% by weight, preferably from 1% to 20% by weight, better still from 2% to 15% by weight, with respect to the total weight of the composition containing it or them.

Adjuvant(s)

The compositions employed by the dyeing method in accordance with the invention can also comprise various adjuvants conventionally used in the hair dyeing compositions, preferably chosen from those of natural origin: surfactants which can be chosen from anionic surface-active agents, amphoteric or zwitterionic surface-active agents, cationic surface-active agents, non-ionic surface-active agents, such as alkyl polyglucosides and lauryl sulfates, and their mixtures; organic or mineral thickening agents which can be chosen from cationic, anionic, non-ionic or amphoteric associative polymers or polysaccharides; antioxidants; penetrating agents; sequestering agents; fragrances; dispersing agents; conditioning agents; film-forming agents; ceramides; preserving agents and opacifying agents.

Of course, a person skilled in the art will take care to choose this or these optional additional compound(s) in such a way that the advantageous properties intrinsically attached to the composition(s) of use in the treatment method in accordance with the invention are not, or not substantially, detrimentally affected by the envisaged addition(s).

The above additives can generally be present in an amount, for each of them, of between 0.01% and 20% by weight, with respect to the total weight of each composition containing them.

The compositions employed in the method according to the invention can be provided in various presentation forms, such as a powder, a poultice, a lotion, a foam, a cream, a gel or in any other form appropriate for dyeing keratin fibres.

Dyeing Method in One or More Stages

According to one embodiment, the method for dyeing keratin fibres according to the invention comprises a stage i) of application of a composition comprising isatin and at least one natural dye chosen from a powder and/or a dye extract of indigo-producing plant(s).

According to one embodiment, stage i) is followed by a stage ii) of application of a composition having a pH ranging from 2.0 to 6.9, preferably from 2.0 to 5.0, more preferentially from 2.0 to 3.0.

Preferably, the composition employed in stage ii) comprises a buffer system as defined above.

The method according to the invention can involve a leave-on time of the composition of stage i) and/or ii). According to a specific embodiment, the leave-on time, on the hair, of the compositions of use according to stages i) and ii) of the hair dyeing method according to the invention is of between 1 minute and 2 hours, more particularly between 5 minutes and 1 h, preferentially between 10 minutes and 1 h. The method according to the invention is carried out at a temperature of generally between 20° C. and 80° C., preferably a temperature of between 25° C. and 50° C.

According to one embodiment, the method for dyeing keratin fibres according to the invention employs an intermediate rinsing stage between stages i) and ii).

More particularly, the method according to the invention employs stage i), then an intermediate rinsing stage, then stage ii).

Stage ii) can be followed by one or more washing stages, followed by one or more operations of rinsing the hair with water and optionally followed by drying by a heat treatment by heating at a temperature of between 30° C. and 90° C. Use may also be made, both as means for heating and smoothing the hair, of a heating iron at a temperature of between 100° C. and 220° C. and preferably between 120° C. and 200° C.

More particularly, the method according to the invention can employ stage i), then an intermediate rinsing stage; optionally, the rinsing stage is followed by a stage of wringing and/or drying, then stage ii), then a rinsing stage, and/or a washing stage.

According to another embodiment, the method for dyeing keratin fibres according to the invention comprises the following stages:
- a stage a) of application of a composition comprising at least one natural dye chosen from a powder and/or a dye extract of indigo-producing plant(s); and
- a stage b) of application of a composition comprising isatin.

Preferably, the method for dyeing keratin fibres according to the invention employs stage a) and then stage b) sequentially.

According to a preferred embodiment, the composition employed in stage a) is obtained by mixing, immediately before use, the powder of indigo-producing plant(s) and/or one or more dye extract(s) of indigo-producing plant(s) with water. According to this embodiment, the aqueous composition employed in stage a) thus obtained is in the form of a poultice.

Preferably, the aqueous composition applied in stage a) to the keratin fibres according to the method of the invention is provided in the form of a poultice.

The term "poultice" is understood to mean a kind of "paste" obtained from a powder of indigo-producing plants which is then diluted at the time of use with the help of hot water and said paste can subsequently be applied to the keratin fibres, in a water/powder ratio preferably ranging from 1 to 10, more preferentially still from 2 to 5, better still 4.

The method according to the invention can involve a leave-on time of the composition of stage a) and/or b). According to a specific embodiment, the leave-on time, on the hair, of the compositions of use according to stages a) and b) of the hair dyeing method according to the invention is of between 1 minute and 2 hours, more particularly between 5 minutes and 1 h, preferentially between 10 minutes and 1 h. The method according to the invention is carried out at a temperature of generally between 20° C. and 80° C., preferably a temperature of between 25° C. and 50° C.

According to one embodiment, the method for dyeing keratin fibres according to the invention employs an intermediate rinsing stage between stages a) and b).

More particularly, the method according to the invention employs stage a), then an intermediate rinsing stage, then stage b).

Stage b) can be followed by one or more washing stages, followed by one or more operations of rinsing the hair with water and optionally followed by drying by a heat treatment by heating at a temperature of between 30° C. and 90° C. Use may also be made, both as means for heating and smoothing the hair, of a heating iron at a temperature of between 100° C. and 220° C. and preferably between 120° C. and 200° C.

More particularly, the method according to the invention can employ stage a), then an intermediate rinsing stage; optionally, the rinsing stage is followed by a stage of wringing and/or drying, then stage b), then a rinsing stage, and/or a washing stage.

EXAMPLES

The colouring of the hair is evaluated in the L*a*b* system, with a Minolta CM3600D spectrocolorimeter (illuminant D65, angle 10°, specular component included).

In this system, L* represents the lightness. The lower the value of L*, the darker and more powerful the colouring obtained. The chromaticity is measured by the values a* and b*, a* representing the red/green axis and b* the yellow/blue axis.

The colour build-up is represented by the colour difference ΔE between the non-dyed lock and the dyed lock: the greater the value of ΔE, the greater the colour build-up. This value is calculated from the following equation (i):

$$\Delta E = \sqrt{(L^* - L_0^*)^2 + (a^* - a_0^*)^2 + (b^* - b_0^*)^2} \quad (i)$$

In the equation (i), L*, a* and b* represent the values measured on locks of non-dyed hair and $L_0^*$, $a_0^*$ and $b_0^*$ represent the values measured on locks of dyed hair.

Example 1

The following dyeing compositions are prepared by mixing, at the time of use, the powders of natural dyes with water at 40° C. in order to produce the following poultices:

TABLE 1

|  | Composition 1 | Composition 2 |
| --- | --- | --- |
| Leaves of *Indigofera tinctoria* | 25 g | 25 g |
| Isatin | — | 0.063 g |
| Water | Q.s. for 100 g | Q.s. for 100 g |
|  | pH = 5.8 +/− 0.2 | pH = 6.0 +/− 0.2 |

These mixtures are applied to locks of natural Caucasian hair containing 90% of white hairs in a proportion of a bath ratio of 10 g per 1 g of lock.

The locks are left to stand at 33° C. for 60 min under cellophane.

On conclusion of the leave-on time, the locks are rinsed, wrung and then dried.

The colorimetric values and the colour build-up ΔE* are listed in the table below:

TABLE 2

|  | L* | a* | b* | ΔE* | Colour T₀ |
| --- | --- | --- | --- | --- | --- |
| Non-dyed NW hair reference | 69.1 | 0.5 | 16.8 | — | — |
| Hair dyed with Composition 1 (comparative method) | 33.0 | −2.1 | 7.2 | 37.4 | Green |
| Hair dyed with Composition 2 (invention method) | 30.9 | 7.0 | 4.7 | 40.5 | Warm brown |

In the case of the hair dyed with Composition 1 (comparative method), the poultice dyes the individual hair in a moderately intense unattractive shade (green).

In the case of the hair dyed with Composition 2 (method according to the invention), intense and attractive browns are obtained while neutralizing the unattractive yellow/green tint.

These observations are confirmed by the values of the colorimetric measurements with: a significantly higher ΔE* in the case of the method according to the invention, significantly lower b* values (less yellow component) and significantly higher a* values (less green component and more red), in comparison with the comparative method.

Furthermore, it is seen that the colouring according to the method of the invention remains stable over time (little change in colour and intensity), unlike the comparative method, which takes more time to achieve a high intensity and changes towards brown (approximately 1 week).

Example 2

The following dyeing compositions are prepared by mixing, at the time of use, the powders of natural dyes with water at 50° C. in order to produce the following poultice:

TABLE 3

|  | Composition 3 | Composition 4 |
| --- | --- | --- |
| Leaves of *Lawsonia inermis* | 7 g | 7 g |
| Leaves of *Indigofera tinctoria* | 18 g | 18 g |
| Isatin |  | 0.05 g |
| Water | Q.s. for 100 g | Q.s. for 100 g |
|  | pH = 5.8 +/− 0.2 | pH = 6.0 +/− 0.2 |

This mixture is applied to locks of natural Caucasian hair containing 90% of white hairs in a proportion of a bath ratio of 10 g per 1 g of lock. The locks are left to stand at 33° C. for 60 min under cellophane. On conclusion of the leave-on time, the locks are rinsed and then wrung.

The following composition is prepared:

TABLE 4

|  | A |
| --- | --- |
| Lactic acid | 2.4 g |
| Phosphoric acid | 0.26 g |
| Sodium phosphate | 0.26 g |
| Water | Q.s. for 100 g |
|  | pH = 2.2 +/− 0.2 |

Composition A is subsequently applied in a proportion of 4 g per g of hair to the locks coloured by Compositions 3 or 4, either after the wringing or after the drying of the hair. The locks are then left to stand at 40° C. for 15 min under cellophane. On conclusion of the leave-on time, all the locks are then rinsed and washed with the shampoo, and then dried.

The colorimetric values and the colour build-up ΔE are listed in the table below:

TABLE 5

|  | L* | a* | b* | ΔE* | Colour $T_0$ |
|---|---|---|---|---|---|
| Non-dyed NW hair reference | 69.1 | 0.5 | 16.8 | — | — |
| Hair dyed with Composition 3 (comparative method) | 40.1 | 3.1 | 19.1 | 29.2 | Yellow-green |
| Hair dyed with Composition 4 (method according to the invention) | 35.0 | 10.9 | 10.8 | 36.2 | Warm brown |
| Hair dyed with Composition 4 and then treated with Composition A on wrung wet hair (method according to the invention) | 33.0 | 6.7 | 5.5 | 38.4 | Intense brown |
| Hair dyed with Composition 4 and then treated with Composition A on dried hair (method according to the invention) | 29.2 | 5.5 | 3.9 | 42.2 | Intense brown |

In the case of the hair dyed with Composition 3 (comparative method), the poultice dyes the individual hair in a less intense shade (yellow-green) despite the presence of a significant amount of indigo in the shade.

In the case of the method according to the invention (hair dyed with Composition 4 and then treated or not treated with Composition A), attractive browns are obtained while neutralizing the unattractive yellow/green tint.

These observations are confirmed by the values of the colorimetric measurements with: significantly higher ΔE* values in the case of the method according to the invention (hair dyed with Composition 4 and then treated or not treated with Composition A), significantly lower b* values (less yellow component) for the hair dyed with the comparative treatment.

Furthermore, the shades obtained are even more intense and colder when the post-treatment (Composition A) was applied.

Furthermore, it is seen that the colourings according to the method of the invention remain stable over time (little change in colour and intensity), unlike the comparative method, which takes more time to achieve a high intensity and changes towards brown after 48 hours to 1 week.

Example 3

The following dyeing composition is prepared by mixing, at the time of use, the powder of natural dye with water at 50° C. in order to produce the following poultice:

TABLE 6

|  | Composition 5 |
|---|---|
| Leaves of *Indigofera tinctoria* | 25 g |
| Water | Q.s. for 100 g |
|  | pH = 6.2 +/− 0.2 |

This mixture is applied to locks of natural Caucasian hair containing 90% of white hairs in a proportion of a bath ratio of 10 g per 1 g of lock. The locks are left to stand at 33° C. for 60 min under cellophane. On conclusion of the leave-on time, the locks are rinsed and then wrung.

The following dyeing composition is prepared by mixing, at the time of use, isatin with water at 50° C.:

TABLE 7

|  | B |
|---|---|
| Isatin | 0.4 g |
| Water | Q.s. for 100 g |
|  | pH = 7 +/− 0.2 |

At $T_0$, warm and intense browns which change little over time are obtained.

The colorimetric values and the colour build-up ΔE are listed in the table below:

TABLE 8

|  | L* | a* | b* | ΔE* | Colour $T_0$ |
|---|---|---|---|---|---|
| Non-dyed NW hair reference | 69.1 | 0.5 | 16.8 | — | — |
| Hair dyed with Composition 5 and then Composition B (method according to the invention) | 33.2 | 14.4 | 7.3 | 39.6 | Warm brown |

Example 4

The following dyeing composition is prepared by mixing, at the time of use, the powders of natural dyes with water at 50° C. in order to produce the following poultice:

TABLE 9

|  | Composition 6 |
|---|---|
| Leaves of *Lawsonia inermis* | 7 g |
| Leaves of *Indigofera tinctoria* | 18 g |
| Water | Q.s. for 100 g |
|  | pH = 5.8 +/− 0.2 |

This mixture is applied to locks of natural Caucasian hair containing 90% of white hairs in a proportion of a bath ratio of 10 g per 1 g of locks. The locks are left to stand at 33° C. for 60 min under cellophane. On conclusion of the leave-on time, the locks are rinsed and then wrung.

The following composition is prepared:

TABLE 10

|  | C |
|---|---|
| Benzyl alcohol | 1 g |
| Isatin | 0.25 g |
| Lactic acid | 2.4 g |
| Phosphoric acid | 0.26 g |
| Sodium phosphate | 0.26 g |
| Water | Q.s. for 100 g |
|  | pH = 2.2 +/− 0.2 |

On conclusion of the leave-on time of the poultices, Composition A is applied in a proportion of 4 g per g of hair. The locks are then left to stand at 40° C. for 20 min under cellophane. On conclusion of the leave-on time, all the locks are then rinsed and washed with the standard shampoo, and then dried. Cold and intense browns are obtained at $T_0$. Moreover, they change little over time.

The colorimetric values and the colour build-up ΔE are listed in the table below:

TABLE 11

|  | L* | a* | b* | ΔE* | Colour T₀ |
|---|---|---|---|---|---|
| Non-dyed NW hair reference | 69.1 | 0.5 | 16.8 | — | — |
| Hair dyed with Composition 6 and then Composition C (method according to the invention) | 29.8 | 7.0 | 3.9 | 41.9 | Cold brown |

The invention claimed is:

1. A method for dyeing keratin fibres, comprising: (i) applying to the keratin fibers composition (A) comprising:
   (a) isatin; and
   (b) at least one natural dye chosen from a powder and/or a dye extract of indigo-producing plant(s),
   wherein composition (A) is an aqueous composition,
   wherein composition (A) has a pH ranging from 2 to 6.9.

2. The method of claim 1, wherein the powder and/or a dye extract of indigo-producing plant(s) originates from genera chosen from *Indigofera, Isatis, Polygonum, Wrightia, Calanthe, Baphicacanthus*, or mixtures thereof.

3. The method of claim 1, wherein the total amount of powder(s) and/or dye extract of indigo-producing plant(s) ranges from 0.01% to 50% by weight, relative the total weight of composition (A).

4. The method of claim 1, wherein the total amount of powder(s) of indigo-producing plant(s) is at least 40% by weight, relative to the total weight of composition (A).

5. The method of claim 1, wherein composition further comprises (c) at least one additional direct dye other than powder(s) and/or dye extract(s) of indigo-producing plant(s) and other than isatin.

6. The method of claim 5, wherein the at least one additional direct dye (c) is chosen from natural direct dye(s) other than powder(s) and/or dye extract(s) of indigo-producing plant(s).

7. The method of claim 5, wherein the at least one additional direct dye (c) is chosen from lawsone, henna extracts, henna powders, or mixtures thereof.

8. The method of claim 1, wherein the pH of composition A ranges from 2.0 to 5.0.

9. The method of claim 1, wherein composition A further comprises at least one organic solvent chosen from ethanol, benzyl alcohol, 1,2-pentanediol, propylene glycol, or mixtures thereof.

10. The method of claim 1, wherein the total amount of isatin ranges from 0.01% to 5% by weight, relative to the total weight of composition A.

11. The method of claim 1, further comprising: (ii) applying to the keratin fibers composition B having a pH ranging from 2.0 to 6.9.

12. The method of claim 11, wherein composition B comprises a buffer system.

13. The method of claim 11, wherein steps (i) and (ii) are performed sequentially.

14. The method of claim 1, wherein the amount of isatin ranges from 0.05% to 2% by weight, relative to the total weight of composition A.

15. The method of claim 11, wherein composition B comprises at least one carboxylic acid of formula (I) or salts thereof:

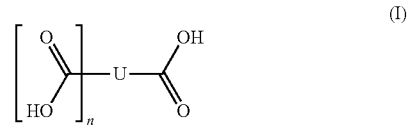

(I)

wherein:
U represents a monovalent group when n has the value 0, or a polyvalent group when n is greater than or equal to 1, wherein the monovalent group and the polyvalent group is each independently chosen from a saturated or unsaturated, a cyclic or non-cyclic, an aromatic or non-aromatic hydrocarbon-based group comprising from 1 to 8 carbon atoms, optionally interrupted by one or more heteroatoms and/or optionally substituted by one or more hydroxyl groups;
n represents an integer ranging from 0 and 10.

16. The method of claim 15, wherein U represents a monovalent ($C_1$-$C_6$) alkyl group or a polyvalent ($C_1$-$C_6$) alkylene group, optionally substituted by one or more hydroxyl and/or amino groups.

17. The method of claim 15, wherein the carboxylic acid is chosen from glycolic acid, citric acid, lactic acid, tartaric acid, salts thereof, or mixtures thereof.

18. The method of claim 15, wherein the carboxylic acid is chosen from glycolic acid, lactic acid, salts thereof, or mixtures thereof.

19. The method of claim 11, further comprising: (iii) rinsing between steps (i) and (ii); and optionally (iv) wringing and/or drying after (iii) rinsing.

20. A composition for dyeing keratin fibers, comprising:
   (a) isatin; and
   (b) at least one natural dye chosen from a powder and/or a dye extract of indigo-producing plant(s),
   wherein the composition is an aqueous composition,
   wherein the composition has a pH ranging from 2 to 6.9.

* * * * *